(12) United States Patent
Williams, Jr.

(10) Patent No.: US 8,412,475 B1
(45) Date of Patent: Apr. 2, 2013

(54) PSEUDORANDOM BINARY DISCRETE INTERVAL NOISE SIGNAL GENERATION AND INJECTION ON TO THE ELECTRIC POWER GRID

(75) Inventor: Olin A. Williams, Jr., Lawrenceville, GA (US)

(73) Assignee: Southern Company Services, Inc., Atlanta, GA (US)

( * ) Notice: Subject to any disclaimer, the term of this patent is extended or adjusted under 35 U.S.C. 154(b) by 686 days.

(21) Appl. No.: 12/645,853

(22) Filed: Dec. 23, 2009

(51) Int. Cl.
*G06F 11/30* (2006.01)
*G21C 17/00* (2006.01)

(52) U.S. Cl. .............. 702/60; 702/69; 340/3.1

(58) Field of Classification Search .............. 702/58–62, 702/69, 74, 79, 108–110, 117, 119–126; 340/3.1, 3.2, 3.43, 3.44
See application file for complete search history.

(56) References Cited

U.S. PATENT DOCUMENTS

| | | | | |
|---|---|---|---|---|
| 3,581,191 A | * | 5/1971 | Anderson | 324/310 |
| 5,561,701 A | * | 10/1996 | Ichikawa | 340/7.26 |
| 5,942,982 A | * | 8/1999 | Noble et al. | 340/652 |
| 2007/0069813 A1 | * | 3/2007 | Li et al. | 330/149 |

* cited by examiner

*Primary Examiner* — Manuel L Barbee
(74) *Attorney, Agent, or Firm* — Womble Carlyle Sandridge & Rice, LLP; John J. Timar (57) ABSTRACT

A synchronized pseudorandom sequence injector is provided for injecting a plurality of pseudorandom signals at selected locations in a power system having a plurality of locations forming a transmission and distribution grid. A synchronization pulse generator generates an accurate reference clocking signal. A pseudorandom clocking and sequence generator receives the clocking signal and generates a string of pseudorandom sequences. A binary drive control creates a tri-state voltage output from a logic level output of the pseudorandom clocking and sequence generator. A signal conditioning interface processes the voltage output to attenuate any protection related carrier signals from a pseudorandom signal injection point at a selected location.

20 Claims, 10 Drawing Sheets

PSEUDORANDOM BINARY DISCRETE INTERVAL NOISE SIGNAL GENERATION AND INJECTION ON TO THE ELECTRIC POWER GRID

CROSS-REFERENCE TO RELATED APPLICATION

This application is related to commonly-owned U.S. patent application Ser. No. 12/022,765 filed Jan. 30, 2008 and entitled "Dynamic Real-Time Power System Monitoring."

TECHNICAL FIELD

Embodiments of the invention relate generally to electric power transmission systems and, more particularly, to monitoring of electric power transmission systems using a time synchronized programmable discrete interval binary pseudorandom sequence signal injection system.

BACKGROUND OF THE INVENTION

Monitoring the state of the electric power grid for operating anomalies, as well as equipment degradation and failures, is important for the reliable supply of electric energy. Current methods involve monitoring parameters such as voltage, current and relative phase angles of the power system as it operates. These actual values are then applied to an electrical model for analysis. These conventional monitoring methods typically require a steady state operational environment for power systems analysis.

Actual power system measurements, from a subset of all key data points in the power system, are typically captured using a Supervisory Control and Data Acquisition (SCADA) system. Each substation connected to the power grid is equipped with several potential and current transformers to measure voltage, current, and electric power flow on each line and bus. The real-time voltage and current data is transmitted from each substation to a central computer through a remote terminal unit. These acquired readings from throughout the power system and are then processed by a state estimator algorithm to determine a complete set of the most likely values for all key points in a model of the power system. System security applications are run on these models to assess the ability of the power system to recover from various possible disturbances. This security contingency analysis attempts to determine if the power system will return to an equilibrium state or become unstable after selected system disturbances.

One characteristic of power system modeling for conventional security analysis is that the system topology and component parameters must be correct for the results to be meaningful. Inaccuracies in conventional security analysis can occur if data sampled from the actual power system are applied to a model that fails to consider a change in system topology, e.g., an open transmission line in its connectivity topology. Furthermore, inaccuracies in the models used for various power system components, such as transmission lines and power plants, can lead to an inaccurate security analysis.

SUMMARY

The embodiments of the time synchronized programmable discrete interval binary pseudorandom sequence signal injection system described herein are used for determining real-time dynamic impulse and frequency response characteristics of the transmission grid and its components. These characteristics are aggregated to provide real-time dynamic monitoring of the state of the power grid and its components.

Embodiments of the time synchronized programmable discrete interval binary pseudorandom sequence signal injection system provide a system and method for creating and injecting synchronized signals into the electric power grid for the purpose of determining real-time dynamic characteristics of the grid and its components. Injected signals are time synchronized with data capture devices at other locations in the power system by using a time sync system such as Global Positioning System (GPS) time synchronization clock units. Injected sequences are sets of binary pseudorandom sequences (PRS). Sets of binary pseudorandom sequences can be generated mathematically using software algorithms or with hardware logic through the use of maximum length Linear Feedback Shift Registers (LFSR). Injected sequence parameters include, but are not limited to, bit rate, sequence length, sequence bit order, and injected signal magnitude. Selection of the various injected sequence parameters is through a manual control interface on the device itself or remotely over a communications link. The sequence may be injected directly on to the power system through an interface device such as a capacitor coupled voltage transformer (CCVT), or inductively through a clamp-on inductive coupling device.

In an exemplary embodiment, a synchronized pseudorandom sequence injector is provided for injecting a plurality of pseudorandom signals at selected locations in a power system having a plurality of locations forming a transmission and distribution grid. A synchronization pulse generator generates an accurate reference clocking signal. A pseudorandom clocking and sequence generator receives the clocking signal and generates a string of pseudorandom sequences. A binary drive control creates a tri-state voltage output from a logic level output of the pseudorandom clocking and sequence generator. A signal conditioning interface processes the voltage output to attenuate any protection related carrier signals from a pseudorandom signal injection point at a selected location.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION

The following description is provided as an enabling teaching of the invention and its best, currently known embodiments. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances, and are a part of the invention. Thus, the following description is provided as illustrative of the principles of the embodiments of the invention and not in limitation thereof, since the scope of the invention is defined by the claims.

Figure 1:
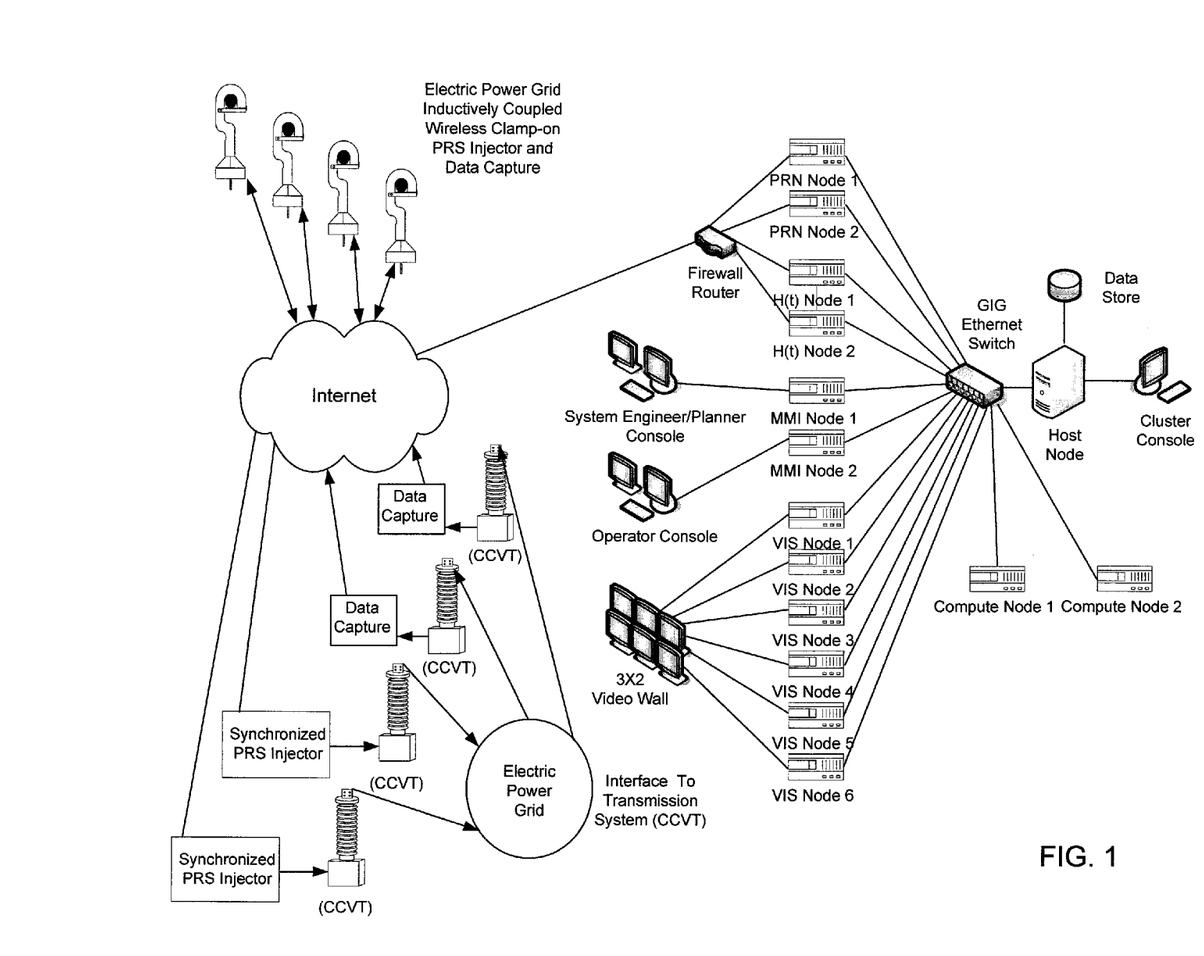
FIG. 1 illustrates the overall real-time dynamic transmission monitoring system incorporating the time synchronized programmable discrete interval binary pseudorandom sequence signal injection system in an exemplary embodiment.

A new approach to monitoring the power system is based on processing the synchronized responses to injected pseudorandom signals at various locations throughout the grid. Real-time analysis of the response data can be used to provide a characterization of the current state of the power grid and its various components. A complete description of a method and system for real-time monitoring of a power system is provided in patent application Ser. No. 12/022,765, now U.S. Pat. No. 7,848,897, which is incorporated by reference in its entirety herein. FIG. 1 illustrates an exemplary embodiment of the overall real-time dynamic transmission monitoring system incorporating the time synchronized programmable discrete interval binary pseudorandom sequence signal injection system.

As described in more detail in related application Ser. No. 12/022,765, a fundamental concept of the independent dynamic transmission monitoring system is the system impulse response function, generally designated h(t). The impulse response of a system is the output of the system when it is presented with a very brief yet large input, i.e., an impulse. A given well-behaved system is completely described by its impulse response function and useful information can be derived directly from the time domain h(t) function. The impulse response function can be used to determine the output of a system to any given input function through the use of the convolution integral. By applying a transform function to the time-domain impulse response function h(t), the system frequency response can be determined. The Fourier transform H($\omega$) thus becomes the frequency domain description of the system and can be used to determine the dynamic characteristics of the system.

In signal processing the cross-correlation between two signals can be described as the measure of the similarity of the two signals. A single cross-correlation value is calculated for each value of the time shift between the two signals. Autocorrelation is defined as the cross-correlation of a time domain signal with itself.

For a "well behaved" system, the impulse response can be determined using cross-correlation techniques and random input signals. The impulse response h(t) can be determined by cross-correlating a random input signal $n_i$ (t) with the resulting system output y(t). The requirements are: (1) the random input signal generated by pseudorandom signal generator must be uncorrelated with the other inputs, and (2) the autocorrelation of the random input signal must be an impulse.

A cross-correlation algorithm for performing impulse response calculations using pseudorandom input signals has been described in U.S. Pat. No. 3,718,813, entitled "Technique for Correlation Method of Determining System Impulse Response." This patent is incorporated by reference herein. This algorithm calculates a system impulse response waveform during each repeated sequence of the pseudorandom noise signal. Use of this algorithm can potentially reduce the complexity and cost of a field-implemented cross-correlator to that of an inexpensive microcontroller.

The real-time cross-correlation calculation technique can be used between selected locations throughout the electric grid to calculate multiple simultaneous impulse response data sets and therefore provide an overall dynamic real-time image of the instantaneous status of the entire power system. An overall status of the "state of connectedness" of the power grid can be monitored in real-time and, by using visualization techniques, this can be used to provide operators with graphic indicators of where and how intense "operating weaknesses" are in the system. A central host system based on a high performance computing (HPC) cluster architecture collects and processes the array of continuous impulse response calculations and creates numeric and visual representations of the dynamic state of the transmission system.

FIG. 1 illustrates an exemplary dynamic transmission monitoring system using the cross-correlation method. The synchronized pseudorandom signal (PRS) injectors and the synchronized impulse response and parameter calculators are located in substations and inter-utility tie points throughout the power system. They communicate with the monitoring center through the Internet using HyperText Transfer Protocol (HTTP). The architecture of the high performance computing cluster monitoring center depicted in FIG. 1 for an exemplary embodiment includes various compute nodes that support the parallel computational and input/output (I/O) functions described in the following paragraphs.

PRN nodes support the functions of starting, stopping and adjusting the parameters of the synchronized pseudorandom signal injectors located throughout the power system.

H(t) Nodes support the functions of starting, stopping and acquiring the cross-correlation data from the synchronized impulse response and parameter calculators located throughout the power system.

MMI Nodes respond to requests from system operators, engineers, planners and coordinators at MMI consoles for real-time dynamic power system configuration information by generating numeric and graphical displays of the state of the power system.

VIS Nodes generate a high resolution multi-screen video wall depicting three dimensional (3D) visualizations of the real-time dynamic power system state based on the collected impulse response data from locations throughout the power system. The video wall can be controlled by requests from the various MMI consoles.

Compute Nodes perform calculations and analysis on the collected impulse response data from H(t) nodes to produce numeric and graphical information for use by MMI nodes and VIS nodes.

Host Node performs cluster management, initializing, starting, stopping and altering cluster processes on the various compute nodes through the cluster console. The host node also incorporates at least one data store hard disk for cluster initialization and archival information storage.

The low latency network fabric of the depicted HPC Cluster is based on Gigabit Ethernet. Each compute node connects to a Gigabit Ethernet switch and inter-node communications is accomplished using Message Passing Interface (MPI) libraries. MPI is the industry-standard Message Passing Interface.

The architecture depicted in FIG. 1 is identical to the architecture used by the vast majority of the fastest, most powerful supercomputers currently available. The depicted configuration uses the Linux operating system (OS), cluster technology, Gigabit Ethernet switches, and commodity off-the-shelf CPUs. Other high performance architectures also can be used to perform the functionality of the components shown in FIG. 1.

The depicted HPC cluster uses diskless compute nodes that boot using PXE (Preboot eXecution Environment). In this environment, the compute nodes are booted from a TFTP server running on the Host Node. The PXE boot process loads the operating system and initial applications into the compute node's random access memory and starts initial execution of the node processes. The firewall router(s) is used to interface the PRN nodes and the H(t) nodes to the Internet where they communicate over HTTP to web servers in the substations located throughout the power system.

The following paragraphs describe the various users at the MMI consoles of the monitoring system depicted in FIG. 1. The users include system operators, system engineers, and system planners.

System operators normally operate the power system. System operators continually monitor the normal power system operating parameters and execute routine system operating procedures such as pre-arranged switching. When system anomalies occur, the system operators take pre-established remedial action to restore the power system to its normal operating state.

System engineers have engineering knowledge of the power system and review changes to the power system configuration for stability and security. System engineers develop the operating procedures that system operators follow.

System planners use the historical power system data and customer needs to plan future additions and modifications to the power system.

The time synchronized programmable discrete interval binary pseudorandom sequence signal injection system is an integral part of the monitoring system for the electric power transmission system and it components. The function of the signal injection system is to generate pseudorandom sequences that are synchronized with data capture elements around the transmission grid. The captured data can be cross-correlated with the injected pseudorandom sequence (PRS) to produce the power system impulse response, h(t), between the injection point and the data capture location.

Figure 2:
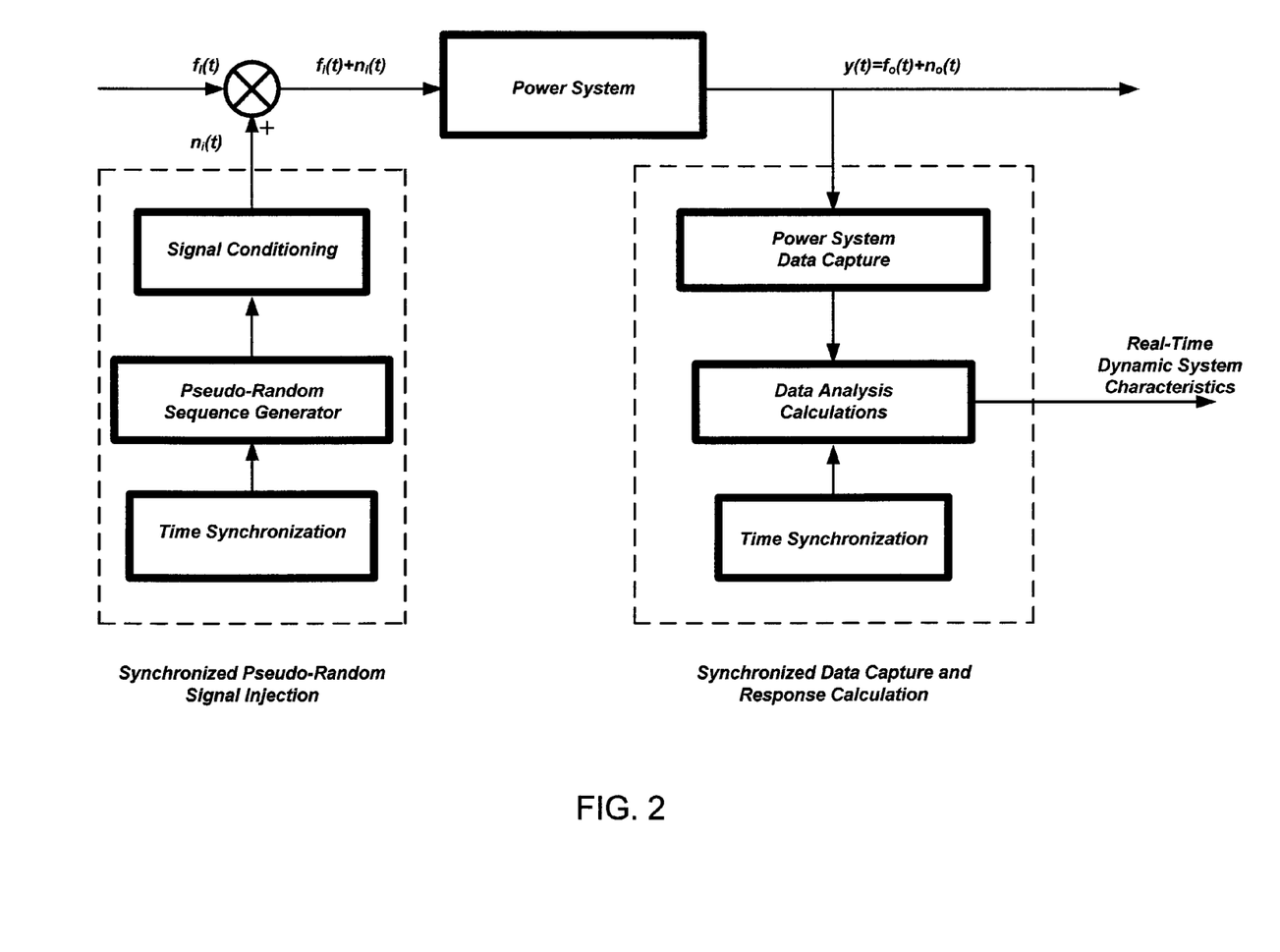
FIG. 2 illustrates a block diagram depicting the basic underlying theory of using injected pseudorandom noise signal and cross-correlation techniques to determine a target system's dynamic characteristics.

FIG. 2 illustrates the basic underlying theory of using injected pseudorandom signal and cross-correlation techniques to determine the real-time dynamic characteristics of a system. As shown in FIG. 2, the time synchronization of a pseudorandom signal generated by pseudorandom sequence generator in the signal injector with the data analysis (e.g., cross-correlation) calculations in the data capture element generates the impulse response h(t) at a separate location in the power system from the location where the signal is being injected. This provides dynamic power system information without relying on an accurate mathematical model of the grid. The actual real world system response information between the two locations on the grid is obtained dynamically in real-time using this approach.

Multiple synchronized data samples can be captured around the transmission system in parallel and cross-correlated with the injected sequence to produce a set of impulse responses from the PRS injection point to the various data capture locations on the grid.

Figure 5:
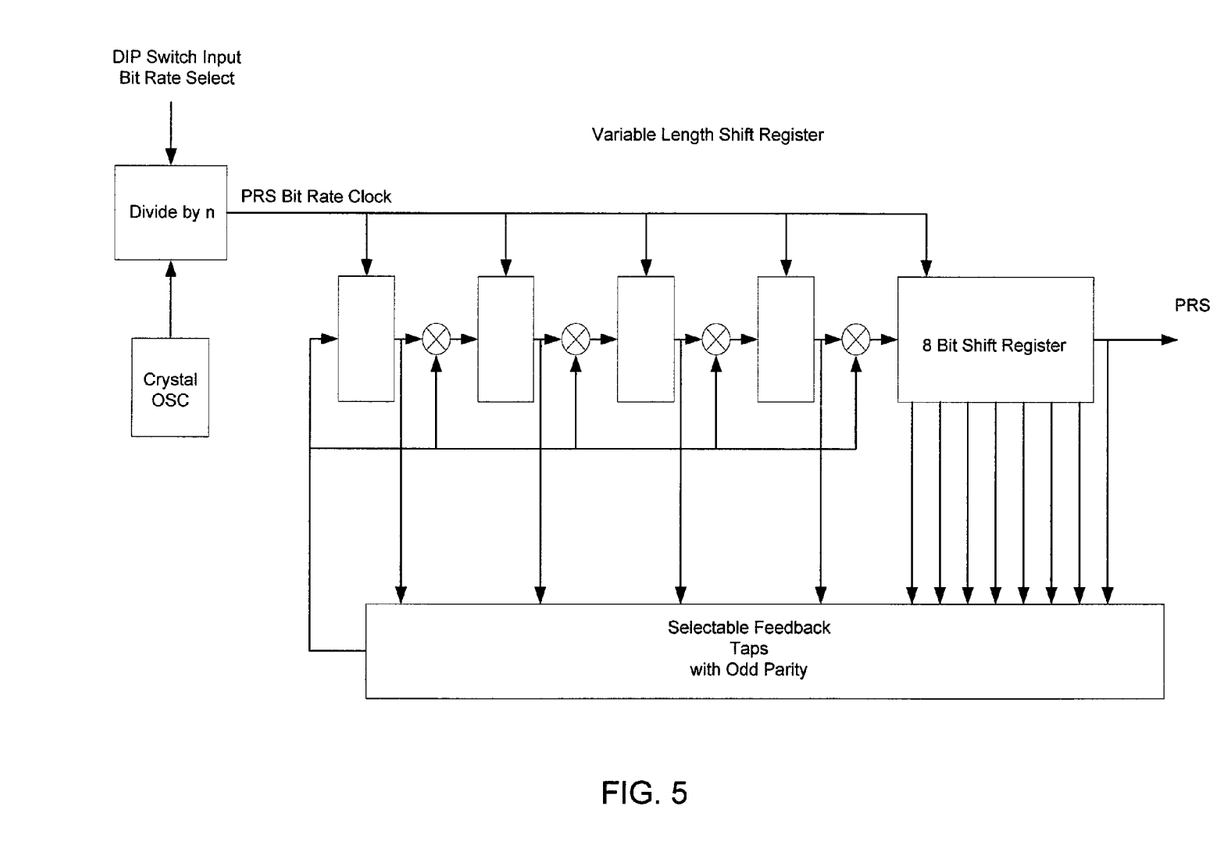
FIG. 5 illustrates the pseudorandom sequence generation subsystem depicting an adjustable bit rate clock, adjustable length Linear Feedback Shift Register (LFSR) and adjustable feedback taps in an exemplary embodiment.

Binary pseudorandom sequences can be generated using a linear feedback shift register (LFSR) with appropriate odd parity feedback from certain elements or stages of the shift register, referred to as taps. Only specific sets of taps produce what is referred to as a maximum length shift register sequence, or a pseudorandom sequence. The discrete interval of these binary sequences is determined by the frequency of the shift register clocking. Although these sequences are absolutely deterministic, they possess statistical randomness properties that make them suitable for determining impulse responses using the cross-correlation method. FIG. 5, discussed below, illustrates a variable length shift register as a component of the PRS clocking and sequence generator in an embodiment of the invention.

Binary pseudorandom sequences generated from an LFSR with n stages and appropriate feedback taps will produce a sequence that is $2^n-1$ bits in length. Typically there are many unique binary pseudorandom sequences that can be generated for a given LFSR of length n based on selecting appropriate feedback taps. Tap tables yielding pseudorandom sequences have been discovered and are widely published.

A useful characteristic of different binary pseudorandom sequences, even different sequences of the same length n, is that they are uncorrelated with each other. As a result of this characteristic, two or more different sequences can be injected into the electric grid at different locations and the synchronized captured data at another location on the grid can be cross-correlated with each of the different sequences to produce the unique impulse responses from the injection locations to the data capture point.

FIG. 5 illustrates an exemplary pseudorandom sequence generation subsystem depicting an adjustable bit rate clock, adjustable length Linear Feedback Shift Register (LFSR) and adjustable feedback taps. A switch selectable divide by n counter circuit reduces the crystal oscillator frequency to the desired PRS bit rate and is used to clock the shift register. An "exclusive OR operation" (XOR, odd parity) on selected outputs from the various stages of the shift register provides the feedback signal to the beginning stage of the shift register. Only certain selected outputs, referred to as "Taps," will produce maximum length LFSR sequences that are pseudorandom.

In the embodiment shown in FIG. 5 the initial stages of the shift register are implemented individually with selectable serial flow control data switches to adjust the configuration. These can be electronic data flow switches or simply configurable hardware jumpers on a printed circuit board. In this example, by directing the XOR feedback signal directly into the 8 bit shift register element and ignoring the four external elements, a LFSR of length $2^8-1$ will be configured. To configure a LFSR of length $2^{12}-1$, referred to as a PN12 configuration, the feedback signal is applied to the left most shift register element and the data flow is directed from the output of each of the external elements to the input of the next, creating a shift register with 12 total elements, i.e., four individual external and eight combined in a single unit. The embodiment shown in FIG. 5 is designed to produce sequences PN8, PN9, PN10, PN11, and PN12 by selecting the appropriate serial data flow configurations.

Figure 3:
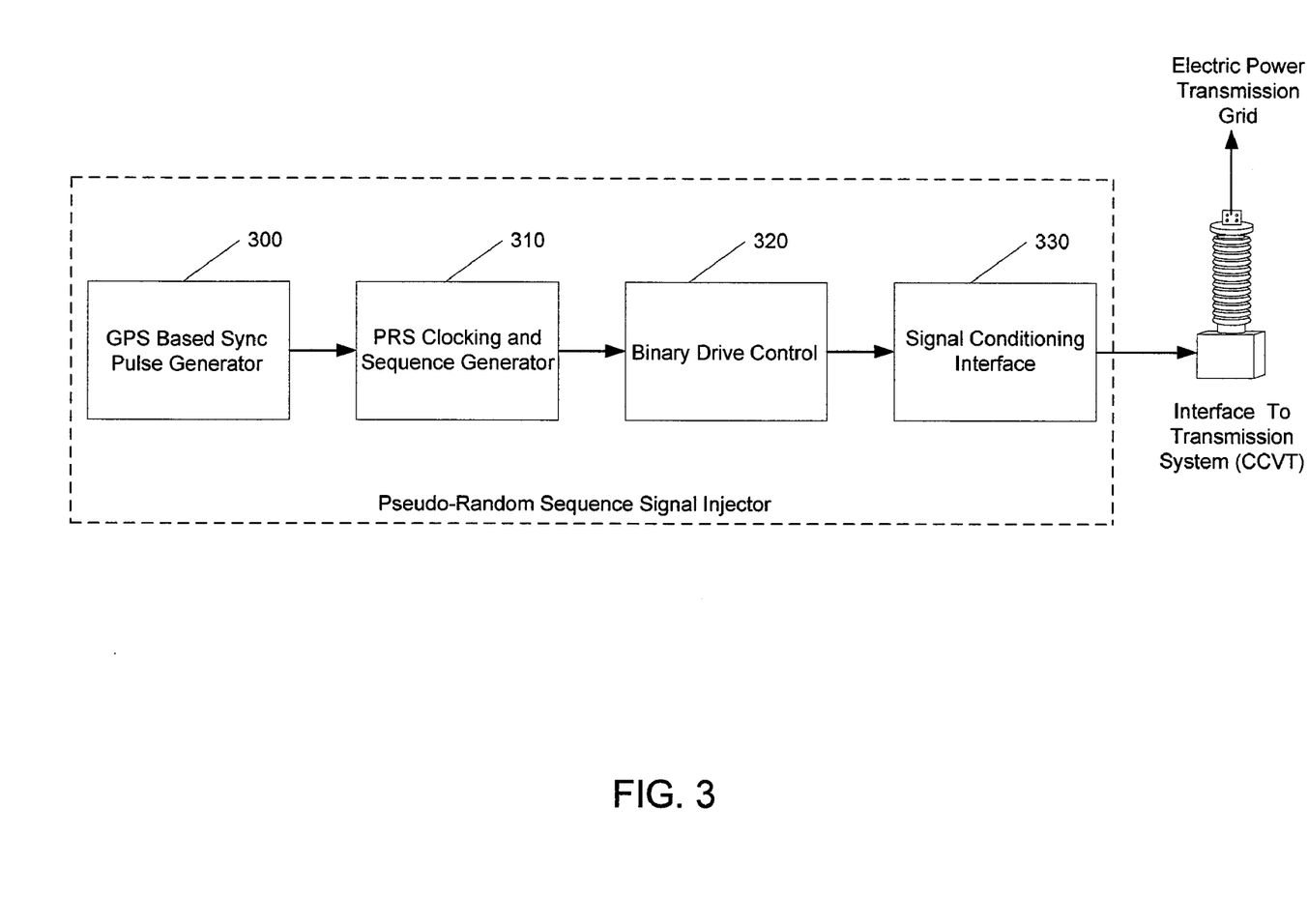
FIG. 3 illustrates a block diagram of the basic components of the time synchronized programmable discrete interval binary pseudorandom sequence signal injection system when used with a coupling capacitor voltage transformer (CCVT) to interface with the electric power transmission grid in an exemplary embodiment.

FIG. 3 illustrates an exemplary block diagram of the basic components of the time synchronized programmable discrete interval binary pseudorandom sequence signal injection system when used with a coupling capacitor voltage transformer (CCVT) to interface with the electric power transmission grid. The pseudorandom sequence signal injection system includes a GPS clock device 300 that generates an accurate synchronization pulse to the PRS signal injector at the same time similar GPS clock devices initiate the data capture events at other locations on the transmission grid. The GPS clock device initiates the generation of a string of pseudorandom sequences created by the PRS clocking and sequence generator 310. A binary drive control 320 creates a tri-state voltage output from the logic level output of the PRS clocking and sequence generator. This voltage signal is then processed by a signal conditioning unit 330 to attenuate any protection related carrier signals and block any 60 Hz and direct current components from the CCVT.

Electric utilities typically use devices, referred to as coupling capacitor voltage transformers (CCVT), to inject one or more carrier frequencies on to a given transmission line as part of the protection scheme. These devices, where they are implemented, offer an ideal way to inject a binary pseudorandom sequence on to the electric power transmission grid.

Figure 8A:
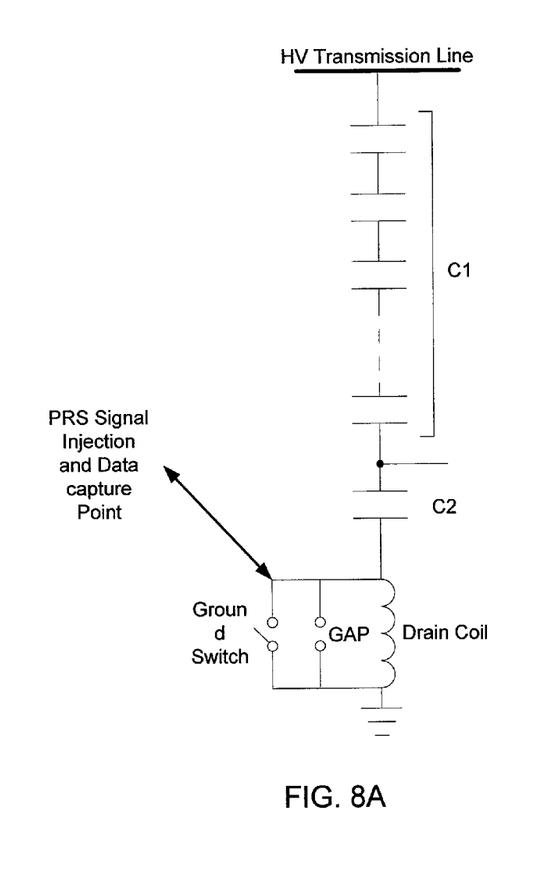
FIGS. 8A-8B illustrate a sample circuit diagram and a sketch of a coupling capacitor voltage transformer (CCVT) for use on the electric power transmission grid in an exemplary embodiment.
Figure 8B:
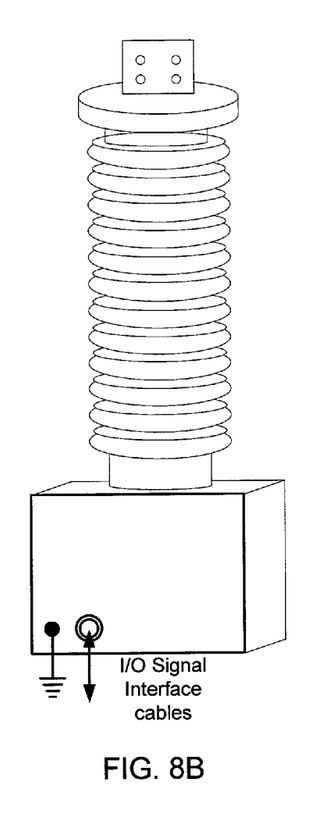

FIGS. 8A-8B illustrate an exemplary sample circuit diagram and a sketch of a coupling capacitor voltage transformer (CCVT) for use on the electric power transmission grid. A CCVT is used in the power industry on high voltage transmission systems as a voltage divider to provide a lower operating voltage for protective relaying and metering equipment. CCVTs also provide a means of inserting and receiving carrier signals over the high voltage transmission lines. FIG. 8A illustrates a typical schematic representation of a CCVT showing the stack of capacitive elements comprising what is referred to as C1 and the lower element C2. Values of the capacitive elements are chosen such that voltage that appears across C2 is a small fraction of the high voltage appearing on the transmission line relative to earth ground. A drain coil in parallel with a spark gap and a grounding switch connects the capacitor stack to earth ground. The drain coil offers a very low impedance to the power line frequency (typically 50 to 60 Hz) and a very high impedance to the carrier signal frequencies (typically 30 to 300 KHz). Conditioned PRS signals injected at the drain coil therefore travel to the transmission line through the capacitor stack. FIG. 8B illustrates the typical form of a CCVT with its insulated capacitor stack mounted on a terminal box containing the drain coil and other carrier tuning equipment.

Figure 7:
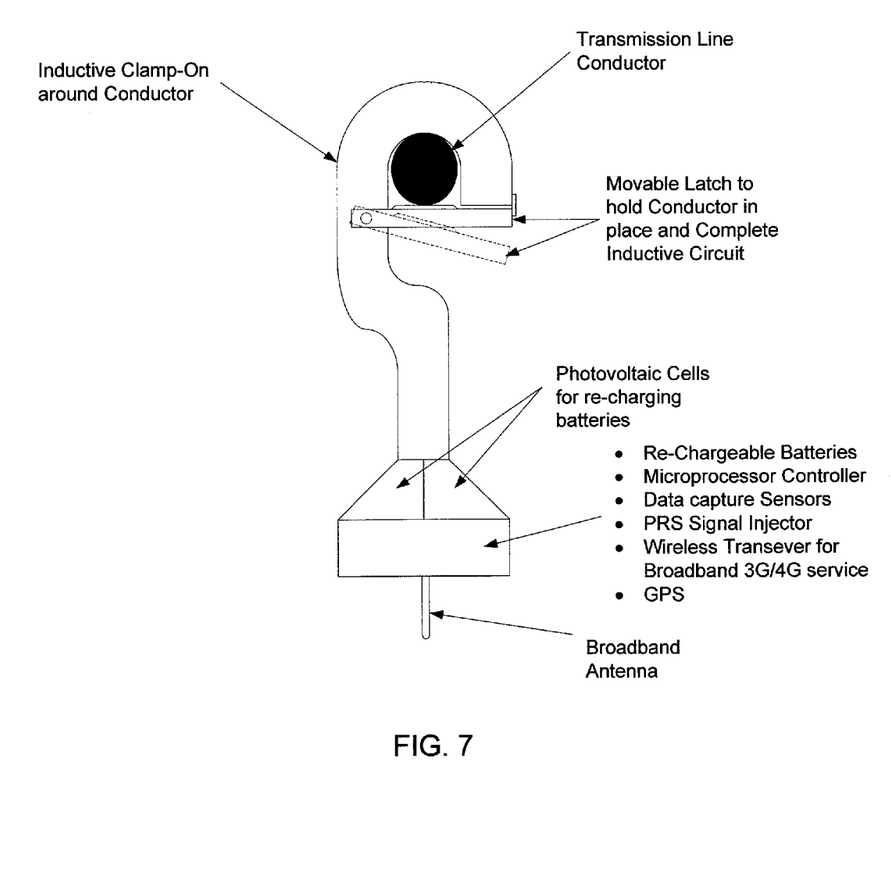
FIG. 7 illustrates an inductively coupled wireless clamp-on PRS injector and data capture device for use on the electric power transmission grid in an exemplary embodiment.

To facilitate deployment of PRS injectors and data capture devices throughout the power grid, especially outside of substations, a quick connect/disconnect clamp-on device is desirable. FIG. 7 illustrates an exemplary inductively coupled wireless clamp-on PRS injector and data capture device for use on the electric power transmission grid. The device can be installed and removed without de-energizing the transmission line by placing it over the conductor and securing the movable latch that also completes the inductive circuit. Photovoltaic cells configured around the top of the base provide charging current for the re-chargeable batteries used to power the unit. The unit is controlled by a microprocessor that interfaces with the hardwired PRS injector unit transmission line data capture elements and the wireless communications transceiver. For this embodiment, the wireless transceiver uses 3G or 4G broadband technology for Internet connectivity. Communications are encrypted for data security. The unit also contains a GPS receiver for device location determination and time synchronization of injected sequences and data capture.

Figure 4:
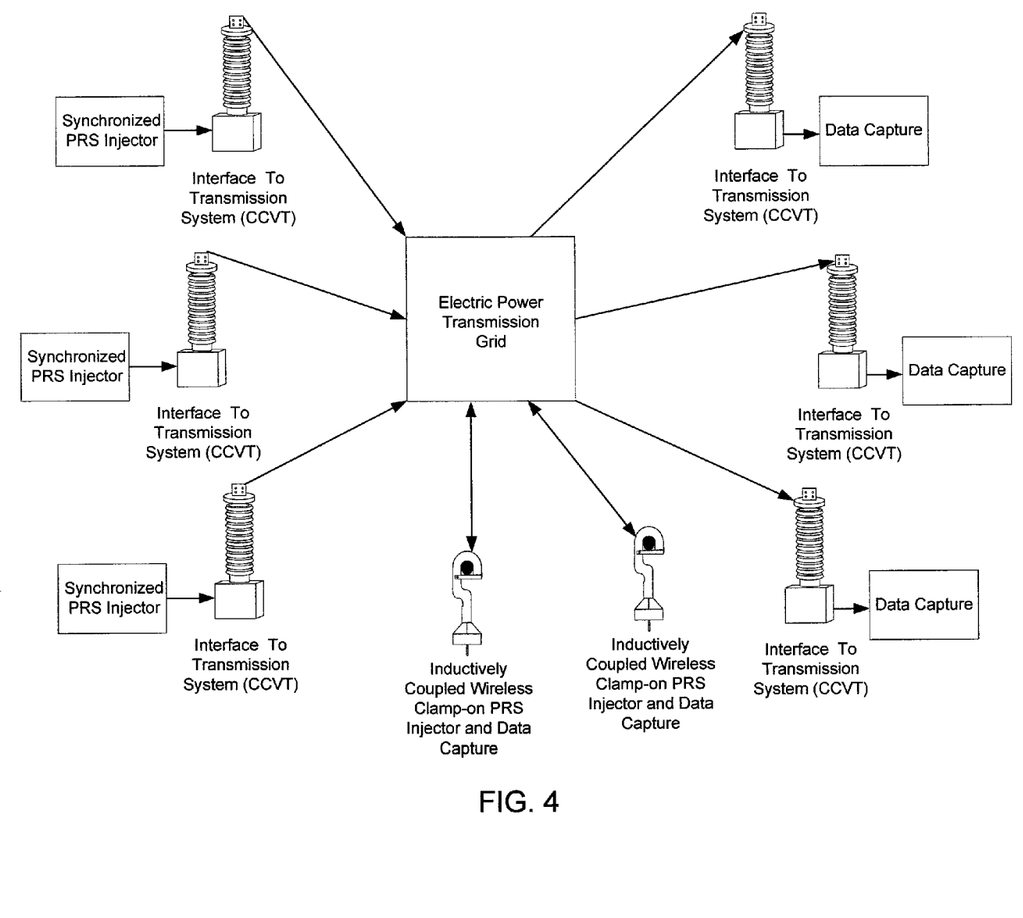
FIG. 4 illustrates deployment of PRS injectors throughout the electric power transmission systems using both CCVTs and inductively coupled devices in an exemplary embodiment.

FIG. 4 illustrates the deployment of both CCVTs and wireless clamp-on devices throughout the electric power transmission grid for synchronized PRS injection and data capture.

Figure 9:
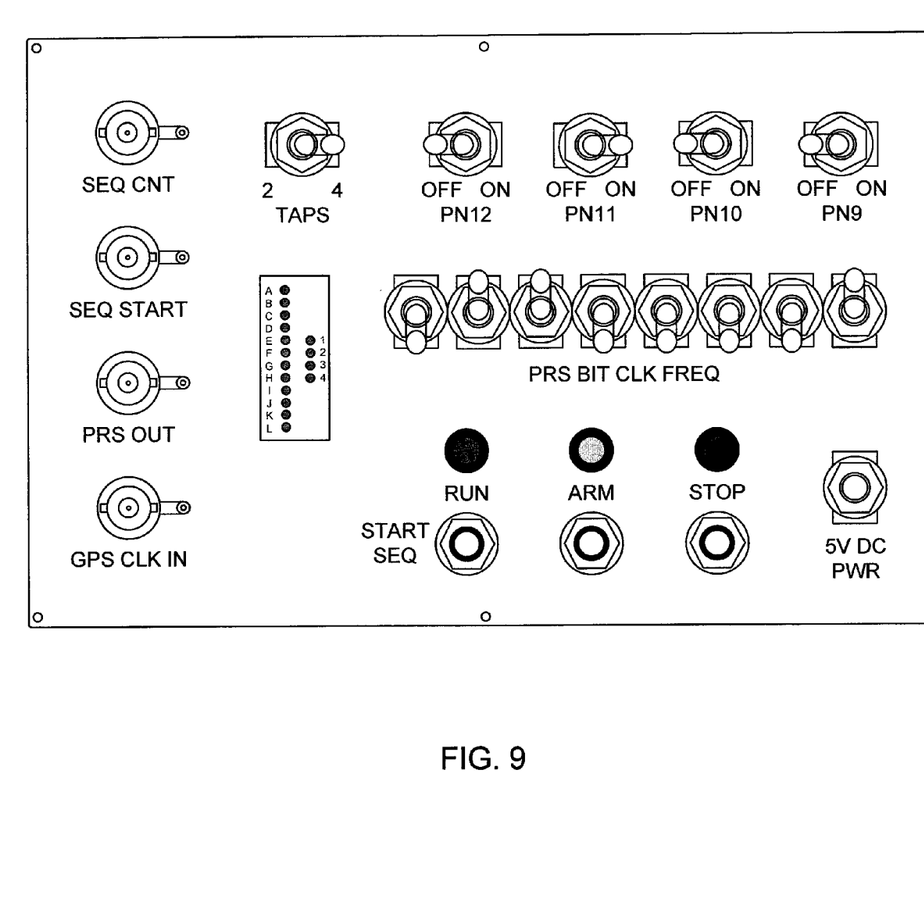
FIG. 9 illustrates a manual control panel for the PRS signal injector subsystem in an exemplary embodiment.

Injector parameters can be set using a manual control panel as depicted in FIG. 9 or though a wireless 3G or 4G broadband Internet connection with the host system as illustrated in the system architecture of FIG. 1. A manual setup of the operating parameters is performed locally via the exemplary control panel shown in FIG. 9. The four sequence length selection switches labeled PN9-PN12 correspond to shift registers of 9-12 stages, respectively. For example, PN9 represents a shift register having nine stages which will cause the PRS signal injector to inject a signal sequence of $2^9-1$ bits in length. The frequency selection switches below the PN9-PN12 switches enable the user to select the PRS bit clock frequency. The sequence control push buttons below the frequency selection switches are used to arm, start, and stop the PRS injection sequence. The power connector is located to the right of the sequence control push buttons. The left side of the control panel depicts the BNC connectors. Tap selection jumpers are located between the BNC connectors and the frequency selection switches on the control panel.

Figure 10:
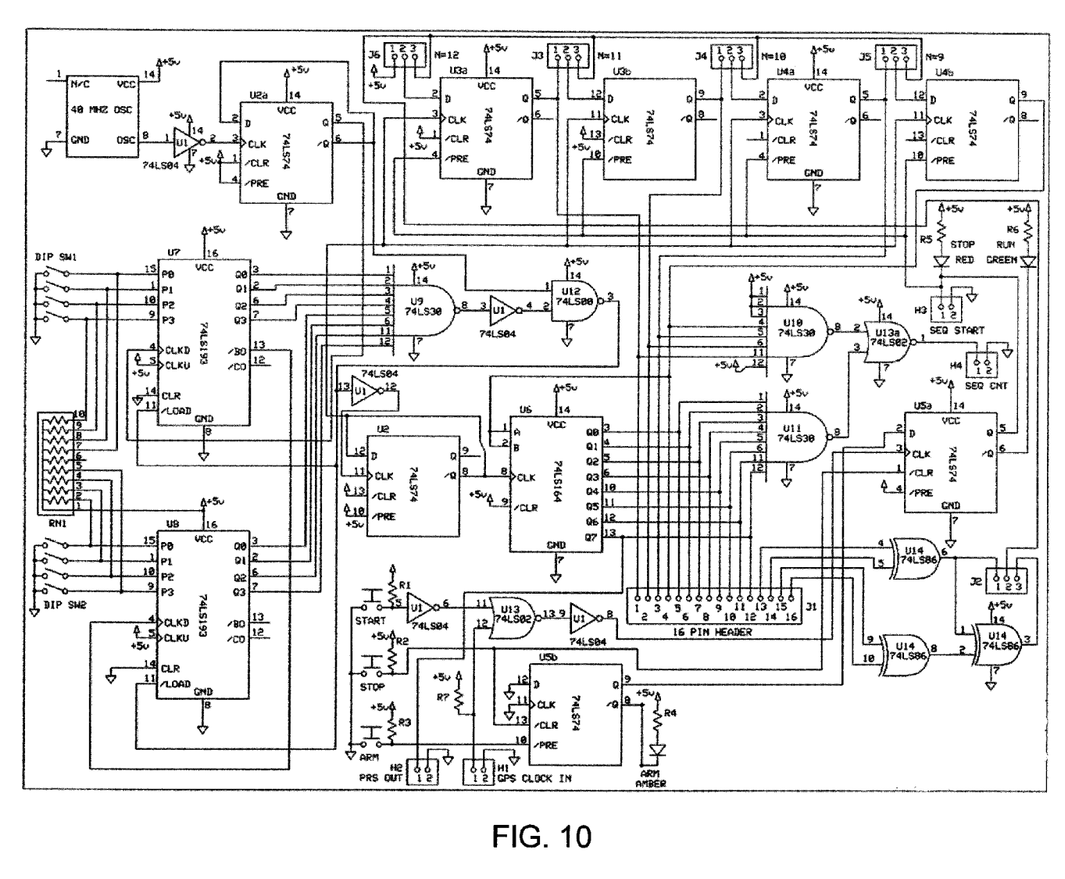
FIG. 10 illustrates a schematic diagram of a hardware embodiment of a time synchronized programmable discrete interval binary pseudorandom sequence signal injection system in an exemplary embodiment.

While the use of a microprocessor-based PRS injector offers wireless remote control of the injector parameters, there is always the threat of a cyber security breach. Thus, the most secure implementation is based on a fixed hardwired PRS injector as illustrated in FIG. 10.

The pseudorandom sequence bit rate timing begins with an oscillator that generates a binary clock signal. In the exemplary embodiment of FIG. 10, the oscillator is a crystal-based 40 MHz printed circuit board unit. The 40 MHz signal is divided by two using a D flip-flop logic element labeled U2a to provide a 50% duty cycle for the clock timing. This 20 MHz clock signal then clocks an eight bit counter, made up of two four bit synchronous counters labeled U7 and U8 in series. The output of this eight bit counter is the pseudorandom sequence bit rate clock. The eight bit counter is preset to a specific count based on the setting of a set of dip switches labeled SW1 and SW2. The counter counts from the specific count down to zero at which time the counter is reset to the count given by the dip switch setting. Therefore, the eight bit dip switch setting determines the pseudorandom sequence bit rate.

The LFSR is made up of four D flip-flop logic elements labeled U3a, U3b, U4a, and U4b, plus an eight bit shift register logic element labeled U6. The sixteen pin header labeled J1 provides a means to select specific feedback taps from elements of the LFSR that are then applied to the XOR gates labeled U14. Jumper J2 provides a means to select a two-tap or a four-tap configuration to generate the odd parity XOR feedback signal. Jumpers labeled J3, J4, J5 and J6 provide for configuration of a PN9, PN10, PN11 or a PN12 length LFSR. Two eight-input NAND logic gates labeled U10 and U11 along with NOR logic gate labeled U13a detect the state in which all elements of the LFSR are a logic "1" and through connector labeled H4 provide a one-bit time logic pulse at the beginning of each pseudorandom sequence. The STOP push button on the control panel resets both D flip-flops labeled U5a and U4b to a logic "0" and energizes the red STOP light-emitting diode (LED). This also holds a preset on D flip-flops labeled U3a, U3b, U4a, and U4b allowing only logic "1's" to be clocked out of the LFSR. The ARM push button on the control panel sets the D flip-flop U5b to a logic "1" and energizes the amber ARM LED. If D flip-flop U5b is in the ARM state (logic "1"), then D flip-flop U5a can be set to a logic "1" by either the START push button on the control panel or a GPS clock pulse. When D flip-flop U5a is set to a logic "1" the green RUN LED is energized and the LFSR will clock through pseudorandom sequences if appropriate taps have been selected.

Figure 6:
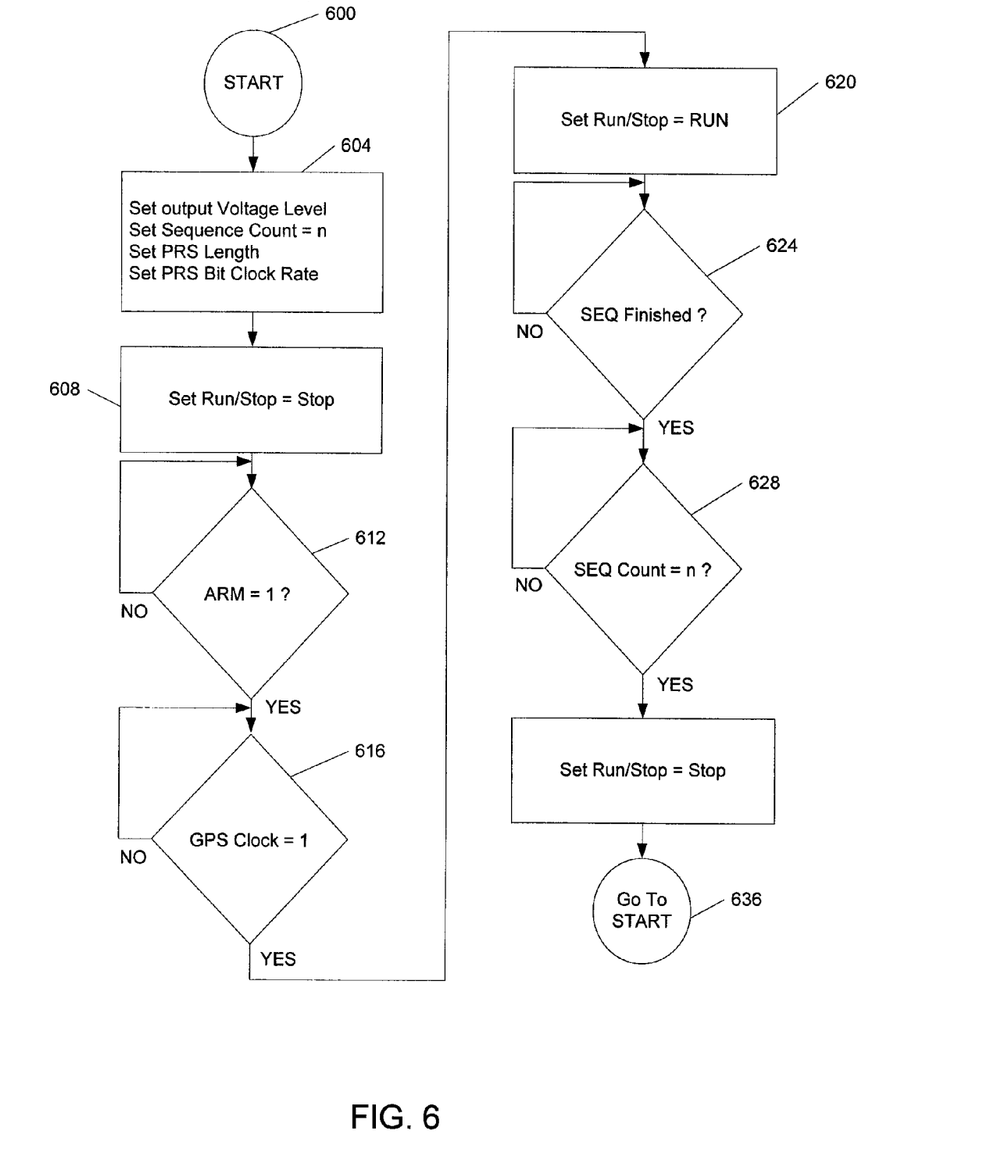
FIG. 6 illustrates processing logic for the pseudorandom sequence generation subsystem in an exemplary embodiment.

FIG. 6 illustrates processing logic for the pseudorandom sequence generation subsystem in an exemplary embodiment. Processing starts in step 600. In step 604, the following values are set: (1) output voltage level, (2) sequence count (n), (3) PRS length, and (4) PRS bit clock rate (e.g., via the PRS bit clock frequency switches of FIG. 9). In step 608, the run/stop function is set to stop. Next, in decision step 612, a determination is made if the ARM function is on (ARM=1). If it is, then in decision step 616 a determination is made if the GPS clock function is on (GPS clock=1). If the GPS clock function is on, then the run/stop function is set to run in step 620. A determination is then made in decision step 624 if the sequence has finished. If the sequence has finished, a determination is made in decision step 628 if the sequence count is equal to the set sequence count. If the sequence count equals the set sequence count, the run/stop function is set to stop as indicated in step 632. Processing logic returns to the start step in connector step 636.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments described without the corresponding use of other features. Accordingly, the foregoing description of the exemplary embodiments is provided for the purpose of illustrating the principles of the invention, and not in limitation thereof, since the scope of the invention is defined solely by the appended claims.

What is claimed:

1. A synchronized pseudorandom sequence injector injection system for injecting a plurality of pseudorandom signals at selected locations in a power system having a plurality of locations forming a transmission and distribution grid, comprising:
   a synchronization pulse generator for generating an accurate clocking signal;
   a pseudorandom clocking and sequence generator for receiving the clocking signal and generating a string of pseudorandom sequences;
   a binary drive control for creating a tri-state voltage output from a logic level output of the pseudorandom clocking and sequence generator; and
   a signal conditioning interface for processing the voltage output to attenuate any protection related carrier signals from a pseudorandom signal injection point at a selected location; and
   an electrical power system component for injecting the pseudorandom signals at the selected location.

2. The synchronized pseudorandom sequence injection system of claim 1 wherein the electrical power system component for injecting the pseudorandom signal comprises a capacitor coupled voltage transformer that interfaces with the power system transmission and distribution grid.

3. The synchronized pseudorandom sequence injection system of claim 1 wherein the electrical power system component for injecting the pseudorandom signal comprises an inductively coupled clamp-on device that interfaces with the power system transmission and distribution grid.

4. The synchronized pseudorandom sequence injection system of claim 1 wherein the pseudorandom clocking and sequence generator comprises an adjustable length linear feedback register and a plurality of adjustable feedback taps.

5. The synchronized pseudorandom sequence injection system of claim 4 wherein the pseudorandom clocking and sequence generator further comprises a crystal oscillator and a divide by n circuit for generating an adjustable bit rate clock.

6. The synchronized pseudorandom sequence injection system of claim 1 further comprising a selectable voltage drive.

7. The synchronized pseudorandom sequence injection system of claim 1 wherein the synchronization pulse generator is based on a Global Positioning System (GPS).

8. The synchronized pseudorandom sequence injection system of claim 1 wherein the string of pseudorandom sequences comprises a plurality of injection parameters including a bit rate, a sequence length, a sequence bit order, and a signal amplitude.

9. The synchronized pseudorandom sequence injection system of claim 8 further comprising a manual control interface for selecting the plurality of injection parameters.

10. The synchronized pseudorandom sequence injection system of claim 1 wherein the signal conditioning interface blocks any 60 Hz alternating current or direct current components from the pseudorandom signal injection point.

11. An inductively coupled wireless clamp-on apparatus for attachment to a transmission line conductor at selected locations in a power system having a plurality of locations forming a transmission and distribution grid, comprising:
    a pseudorandom signal injector for injecting the plurality of pseudorandom signals at selected locations in a power system;
    a plurality of data capture sensors for capturing a time-synchronized response signal at a separate location in the power system from the location at which the pseudorandom signal is injected;
    a microprocessor controller for performing a cross-correlation of the captured response signal with the injected pseudorandom signal to determine a power system impulse response between the injection point location and the data capture location; and
    a wireless transceiver for providing broadband communications of injected pseudorandom signals and captured response signals over the power system transmission and distribution grid.

12. The inductively coupled wireless clamp-on apparatus of claim 11 further comprising a movable latch for securing the clamp-on apparatus around the transmission line conductor and completing an inductive circuit.

13. The inductively coupled wireless clamp-on apparatus of claim 11 further comprising a plurality of batteries for powering the clamp-on apparatus and a plurality of photovoltaic cells for recharging the batteries.

14. The inductively coupled wireless clamp-on apparatus of claim 11 wherein the wireless transceiver comprises a broadband antenna and provides 3G and 4G wireless broadband service.

15. The inductively coupled wireless clamp-on apparatus of claim 11 wherein the pseudorandom signal injector comprises:
- a synchronization pulse generator for generating an accurate clocking signal;
- a pseudorandom clocking and sequence generator for receiving the clocking signal and generating a string of pseudorandom sequences;
- a binary drive control for creating a tri-state voltage output from a logic level output of the pseudorandom clocking and sequence generator; and
- a signal conditioning interface for processing the voltage output to attenuate any protection related carrier signals from a pseudorandom signal injection point at a selected location.

16. The inductively coupled wireless clamp-on apparatus of claim 15 wherein the pseudorandom clocking and sequence generator comprises an adjustable length linear feedback register and a plurality of adjustable feedback taps.

17. The inductively coupled wireless clamp-on apparatus of claim 15 wherein the string of pseudorandom sequences comprises a plurality of injection parameters including a bit rate, a sequence length, a sequence bit order, and a signal amplitude.

18. The inductively coupled wireless clamp-on apparatus of claim 17 wherein the pseudorandom signal injector further comprises a manual control interface for selecting the plurality of injection parameters.

19. The inductively coupled wireless clamp-on apparatus of claim 17 wherein the plurality of injection parameters are set via a wireless broadband Internet connection with a host data processing system.

20. The inductively coupled wireless clamp-on apparatus of claim 15 wherein the pseudorandom signal injector further comprises a hardwired electrical circuit.

* * * * *